Dec. 16, 1930.  C. C. BARNES  1,785,689
SKIMMER
Filed Jan. 21, 1929
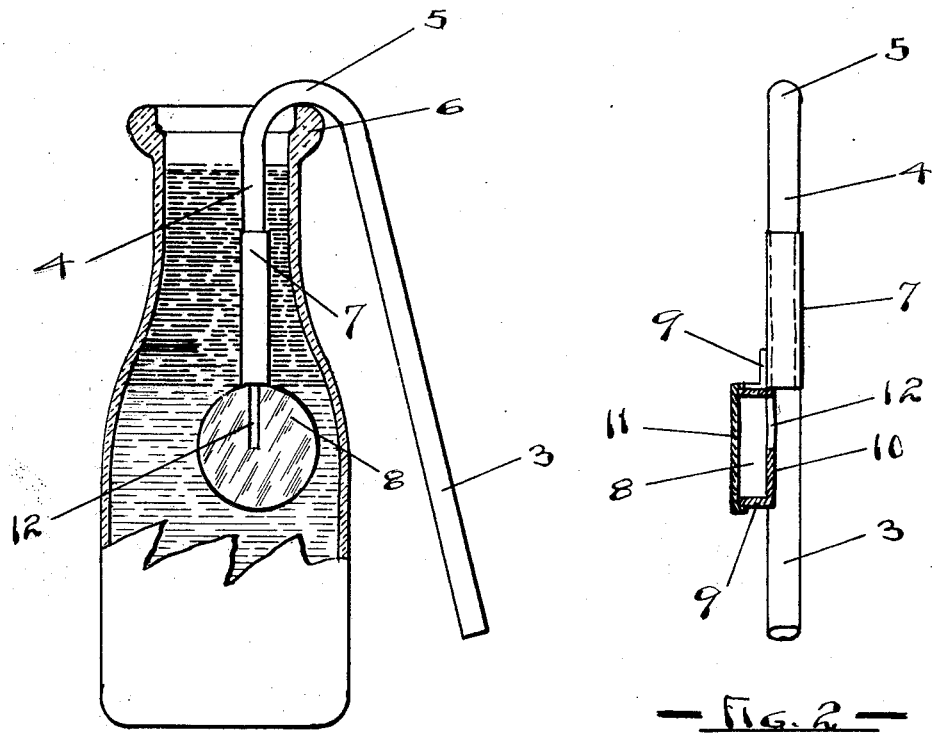
INVENTOR
CARL C. BARNES
BY C.F. Blake
ATTY.

Patented Dec. 16, 1930

1,785,689

UNITED STATES PATENT OFFICE

CARL C. BARNES, OF PORTLAND, OREGON

SKIMMER

Application filed January 21, 1929. Serial No. 333,941.

My invention relates to skimmers in general, and particularly to that type of skimmer adapted to remove the cream from a milk bottle, and more particularly to that type of cream skimmers which operates on the self-starting siphon principle. The object of my invention is to provide in a very simple construction a device that will eliminate some of the disadvantages of previously known and used devices of this character as hereinafter described. I accomplish this object by means of the construction illustrated in the accompanying drawing, which is a part of this application for Letters Patent, like characters of reference indicating like parts throughout the several views thereof, and in which:

Fig. 1 is a sectional elevation of a milk bottle with my device in use therewith.

Fig. 2 is a side elevation of my device in the direction of the arrow in Fig. 1.

In general my device consists of a siphon tube with an orificed air chamber longitudinally adjustably mounted upon the intake end thereof, with the orifice in said air chamber adjacent the open intake end of said siphon tube but not in direct communication therewith.

In many types of self-starting cream skimmers the air that causes the starting pressure is allowed to enter the intake end of the siphon tube in a single bubble or mass, and often such a single bubble is insufficient to lift the considerable mass of liquid to a point where the siphonic action will start. To overcome this disadvantage, and to provide a device that will always start I eliminate the direct connection of the air chamber with the intake end of the siphon tube, separating the same, so that the air from the air chamber necessarily must pass to the open end of the siphon tube through the main body of liquid in the bottle. The result is a series of small bubbles of air entering the siphon tube successively, with small volumes of liquid separating each adjacent pair of bubbles of air. Energy is imparted to each bubble of air as it passes through the main body of the liquid in the bottle, so that each air bubble enters the intake end of the siphon tube with this energy to expend in lifting the volume of liquid immediately above it, and with the velocity imparted to the air bubble as it passes through the main body of liquid in the bottle. The combined effect of such a series of air bubbles with the energy and velocity imparted to each as it passes upward through the main body of liquid is a series of minute blows upon the small volumes of liquid that separate the air bubbles in the siphon tube. I have discovered that such an arrangement of the air bubbles overcomes the sluggish action within the siphon tube due to the friction of the liquid therein, and thus results in a device that will always start readily.

The siphon tube is simply a bent tube open at each end, and having a discharge end and an intake end designated 3 and 4 respectively, said ends being connected by a bent portion 5 adapted to hang upon the lip of the milk bottle 6, as shown in Fig. 1. There is no port or opening in said siphon tube other than the open ends thereof. Telescoped upon the intake end 4 of the siphon tube is an adjustment tube 7, slidable upon the siphon tube with a fit sufficiently close to retain the adjustment tube in any desired position.

Upon the lower end of said adjustment tube is secured an air chamber 8, conveniently by a clip 9 soldered to said air chamber and to said adjustment tube, as shown in Fig. 2. Said air chamber may be of any suitable form, that shown being a cylindrical casing 9 with a closure 10 integral therewith, said closure 10 being disposed adjacent the lower end of the adjustment tube 7, but offset therefrom, as shown in Fig. 2. A cover 11 is provided for the air chamber 8.

The air chamber is orificed to admit liquid thereinto and allow air to escape as said liquid enters, said orifice being so arranged that the air escapes from the air chamber immediately adjacent and below the lower end of the adjustment tube 7. The preferred manner of orificing the air chamber to obtain that result is to provide an elongated orifice or slot 12 in the closure 10, the upper end of said slot being immediately adjacent the lower end of the adjustment tube 7, and the lower end of said slot being disposed substantially at the center of the air chamber, as shown in Fig. 1.

The operation of my device is as follows:

The adjustment tube is first moved to a point upon the siphon tube such that the distance from the bent portion of the siphon tube to the lower end of the adjustment tube is just equal to the distance from the bottle lip 6 to the dividing line between the cream and the milk. The intake end 4 of the siphon tube together with the adjustment tube 7 and air chamber 8 thereupon, is lowered into the bottle until it comes to rest upon the bottle lip 6, as shown in Fig. 1. As the air chamber passes downward through the cream, some of the cream enters the slot 12, thus displacing the air in said air chamber. The displaced air passes out through the slot 12, and as it passes therethrough it encounters the resistance or opposition of the entering cream. The result is that the air is discharged from the air chamber in a series of small bubbles, directly beneath the open end of the adjustment tube 7 upon the siphon intake end 4. Each bubble of air floats upward a short distance in the liquid within the bottle before it enters the siphon tube, and then it enters said tube with the energy and velocity inparted to it by reason of its buoyancy. Thus, instead of entering the siphon tube slowly as the device is inserted into the liquid, the air enters the siphon tube with a slight impact, each bubble after the preceding. These repeated impacts upon the small volumes of liquid trapped between the air bubbles carries the liquid to the top of the bent portion 5 of the siphon tube and over into the discharge portion 3, thus setting up the siphonic action. I have discovered that the action of these several small bubbles of air entering the siphon tube at intervals is much more certain to carry the liquid up and over the bent portion of the siphon tube than that heretofore common method of employing but a single volume of air which rises in the intake end of the siphon tube only as fast as said tube is lowered into the liquid. In my device the velocity of the air bubbles is substantially unaffected by the speed with which the device is lowered into the liquid, and thus the desired result of certainty in carrying the liquid over the bent portion 5 of the siphon tube is attained.

My device may be made of any size, and constructed of any materials deemed convenient and suitable for a device of this character, and while I have illustrated and described a form of construction found desirable in materializing my device, I wish to include in this application all mechanical equivalents and substitutes that may fairly be considered to come within the scope and purview of my invention as defined in the appended claim.

Having disclosed my invention so that others may be enabled to construct and to use the same, what I claim as new, and desire to secure by Letters Patent is:

In a skimmer: a siphon tube open at each end; an air chamber at the intake end of said tube and offset therefrom; and an orifice in said chamber to admit liquid thereinto, and to discharge air into the body of liquid into which said air chamber has been immersed, said air being discharged from said orifice immediately below the intake end of said siphon tube.

In witness whereof I claim the foregoing as my own I hereunto affix my signature at Portland, county of Multnomah, State of Oregon, this 15th day of Jan., 1929.

CARL C. BARNES.